(12) United States Patent
Kuo (10) Patent No.: US 8,770,403 B2
(45) Date of Patent: Jul. 8, 2014

(54) HOLDING AID

(76) Inventor: Chun-Fu Kuo, Taichung (TW)

(*) Notice: Subject to any disclaimer, the term of this patent is extended or adjusted under 35 U.S.C. 154(b) by 0 days.

(21) Appl. No.: 13/535,049

(22) Filed: Jun. 27, 2012

(65) Prior Publication Data

US 2014/0001083 A1    Jan. 2, 2014

(51) Int. Cl.
  *B65D 85/00*    (2006.01)
(52) U.S. Cl.
  USPC .......................... 206/320; 206/736; 150/154
(58) Field of Classification Search
  USPC ........ 206/320, 316.3, 304.1, 304.2, 736, 770, 206/305, 701; 150/154, 165
  See application file for complete search history.

(56) References Cited

U.S. PATENT DOCUMENTS

| | | | | | |
|---|---|---|---|---|---|
| 5,816,464 | A | * | 10/1998 | Seiler | 224/615 |
| D592,400 | S | * | 5/2009 | Nelson | D3/303 |
| 7,986,872 | B2 | * | 7/2011 | Steiner et al. | 396/27 |
| 8,146,742 | B2 | * | 4/2012 | Kumasaka | 206/440 |
| 2005/0279661 | A1 | * | 12/2005 | Hodges | 206/320 |
| 2006/0124482 | A1 | * | 6/2006 | Hodges | 206/320 |
| 2013/0233745 | A1 | * | 9/2013 | Tierney et al. | 206/320 |

\* cited by examiner

*Primary Examiner* — Steven A. Reynolds (57) ABSTRACT

A holding aid of the present invention includes an attachment mechanism, two masks, and a hand holding structure. The attachment mechanism is used for attaching on an electronic product. The masks are connected to the attachment mechanism for covering the electronic product. The hand holding structure includes one or several gashes which are formed on the masks. Thus, user's hand can penetrate through the gashes for holding. Therefore, it is realized that functions of covering and sheltering and easy holding are provided by single accessory.

6 Claims, 13 Drawing Sheets

HOLDING AID

BACKGROUND OF THE INVENTION

1. Field of the Invention

The present invention relates to an aid which provides functions of covering protection and slippery resistant for portable devices.

2. Description of the Prior Art

Nowadays, tablet computer and other portable electronic devices are popular. For manipulating, users always hold the back side of the electronic device with single hand, and flip the touch screen with the other hand. Unfortunately, the electronic device can fall from user's hand easily, especially when the electronic device is held slanted, since the back side of the electronic device is provided with a simple planar surface. User's property can be damaged easily.

Since then, plenty kinds of aid, such as described in US patent application US2004/0226973 and TW utility model TWM410243, TWM409688, and TWM412659, are provided for holding on the back side of the electronic device by user's hand. In US2004/0226973, TWM410243, and TWM409688, the aids are provided with grasping portions on the back side of the electronic device. In TWM412659, the aid is provided with a foldable sleeve portion for user's hand to penetrate therethrough. However, some of the aids are too complicated to be produced or utilized, and the others are too simplified to maintain ideal structure strength, such as the aid described in TWM409688. The most important is that the aids described above provide no protection function for the touch screen or the shell of the electronic device. For sheltering the electronic device from accidental collision, protect membrane, bag, or layer has to be applied to the electronic device. Therefore, additional accessories for the electronic device are necessary, increasing size and weight of the electronic device. Beside, abrupt and uneven appearance of the aids can hardly widely welcomed by the public.

The present invention is, therefore, arisen to obviate or at least mitigate the above mentioned disadvantages.

SUMMARY OF THE INVENTION

The main object of the present invention is to provide a holding aid which can bring user functions of covering and slip resisting for electronic device with simplified structure.

To achieve the above and other objects, a holding aid of the present invention includes a main body which includes an attachment mechanism, a first mask, a second mask, and a hand holding structure.

The attachment mechanism is utilized for attaching on an electronic product. The attachment mechanism has a first surface and a second surface which are opposite to each other.

The first mask is planar and flexible. The first mask has a third surface and a fourth surface which are opposite to each other. The first mask is parallel to the attachment mechanism. At least a part of a periphery of the first mask is connected to at least a part of a periphery of the attachment mechanism. The fourth surface faces the first surface.

The second mask is planar and flexible. The second mask has a fifth surface and a sixth surface which are opposite to each other. The second mask is parallel to the attachment mechanism. At least a part of a periphery of the second mask is connected to at least a part of the periphery of the attachment mechanism. The sixth surface faces the first surface.

The hand holding structure is disposed on at least one of the fourth surface of the first mask and the sixth surface of the second mask.

A receiving space is defined by the attachment mechanism, the fourth surface of the first mask, and the sixth surface of the second mask. The receiving space is adapted for the electronic product to be received therein.

The first mask and the second mask are flexible, being able to be flipped and turned over to the second surface of the attachment mechanism. The third surface of the first mask and the fifth surface of the second mask face the second surface of the attachment mechanism when the first mask and the second mask are flipped and turned over. Thus, the hand holding structure and the electronic product received in the receiving space are exposed outwardly, and prepared for manual holding and operating.

Therefore, in manipulating, user can hold the electronic device together with the holding aid by holding the hand holding structure. In general, the masks can be flipped and cover the first surface for covering the electronic device.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 8 for a first embodiment of the present invention. The holding aid of the present embodiment includes a main body 1 which includes an attachment mechanism 11, a first mask 12, a second mask 13, and at least a hand holding structure 14.

The attachment mechanism 11 is utilized for attaching or being attached on an electronic product 2. The attachment mechanism has a first surface and a second surface which are opposite to each other. For attaching on the electronic product, in the present embodiment, the attachment mechanism is an attaching frame which is able to wrap a periphery portion of the electronic product 2.

Figure 15:
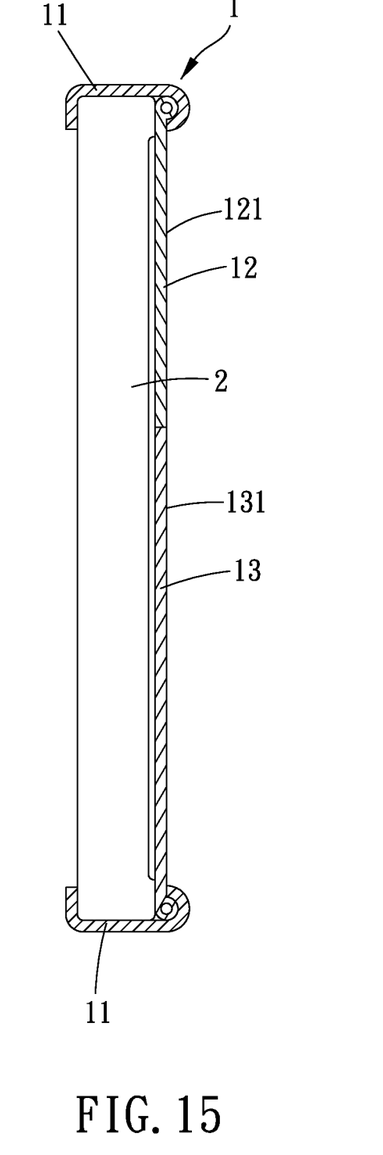
FIGS. 15 and 15A are profiles showing a fifth embodiment of the present invention.
Figure 15A:
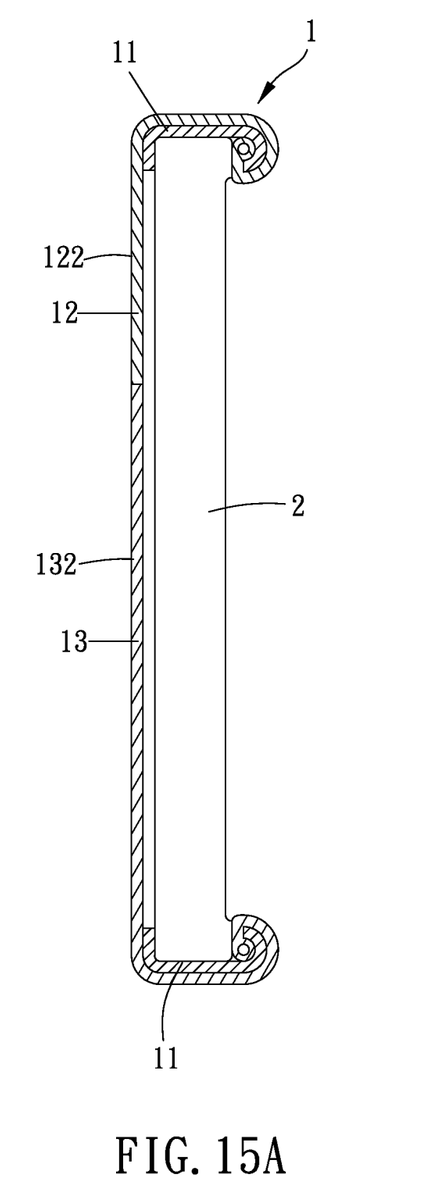
Figure 17:
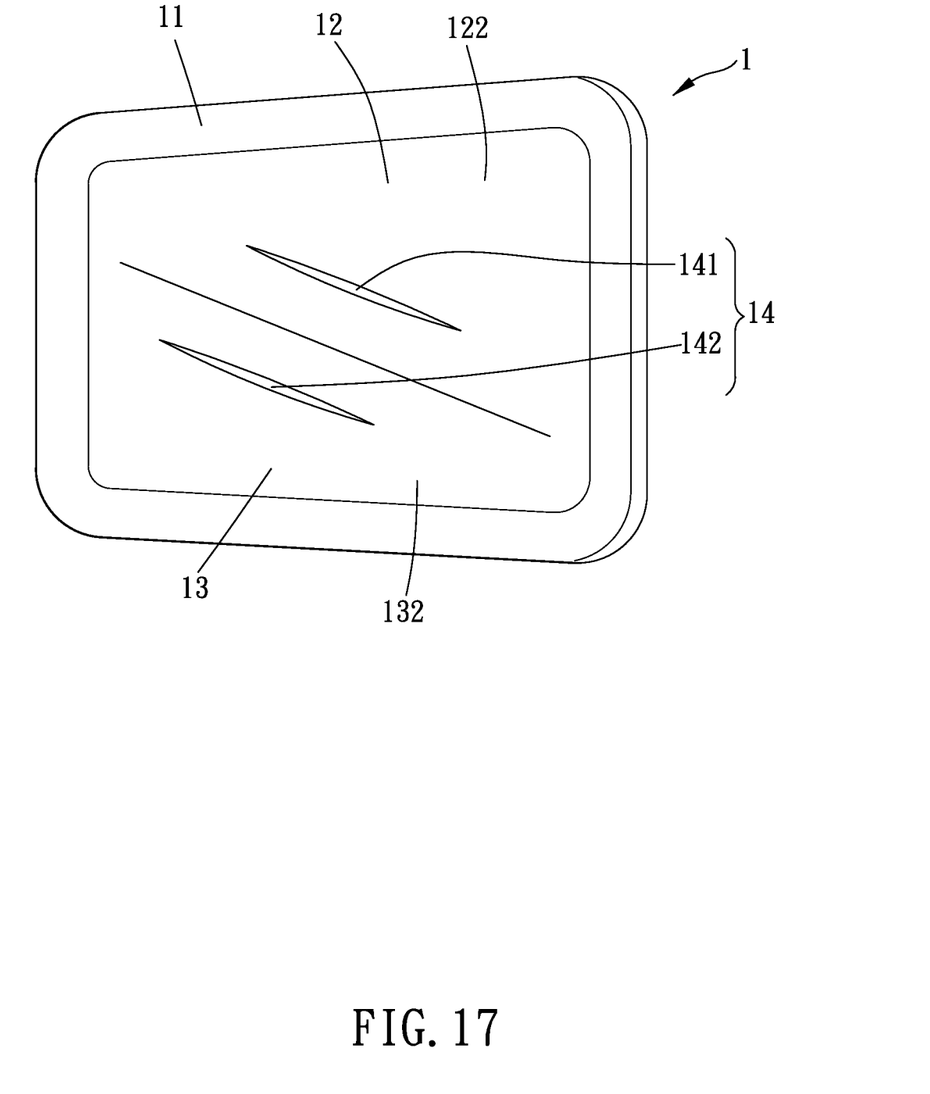
FIG. 17 is a stereogram showing a seventh embodiment of the present invention.

Both of the first and second masks 12, 13 are planar and flexible since they are made of flexible material. Preferably, the masks are elastic, also. The first mask 12 has a third surface 121 and a fourth surface 122 which are opposite to each other. The second mask 13 has a fifth surface 131 and a sixth surface 132 which are opposite to each other. Both of the first mask 12 and the second mask 13 are parallel to the attachment mechanism 11. Peripheries the first mask 12 and the second mask 13 are partially connected to parts of a periphery of the attachment mechanism 11 respectively. The fourth surface 122 and the sixth surface 132 face the first surface of the attachment mechanism 11. An edge of the first mask 12 and an edge of the second mask 13 which are not connected to the attachment mechanism 11 are lined abreast and adjacent each other. Thus, the first surface of the attachment mechanism 11 is completely covered by the first mask 12 and the second mask 13. Preferably, the first mask 12 and the second mask 13 are partially connected at the ends of the edges lined abreast, being formed in single piece, as shown in FIG. 17. A receiving space is defined by and between the attachment mechanism 11, the fourth surface 122 of the first mask 12, and the sixth surface 132 of the second mask 13. The receiving space is provided for receiving the electronic product therein. In another embodiment of the present invention, please refer to FIG. 15 and FIG. 15A, the attachment mechanism may has an annular groove. The first mask 12 and the second mask 13 are mounted to an annular frame. The annular frame is embedded in the annular groove, so that the masks are detachably connected to the attachment mechanism 11.

The hand holding structure 14 is disposed on at least one of the fourth surface 122 of the first mask 12 and the sixth surface 132 of the second mask 13. Preferably, the hand holding structure 14 includes one or several gashes which is/are formed on the fourth surface 122 or/and the sixth surface 132. In the present embodiment, two gashes 141, 142 are formed respectively on the fourth surface 122 and the sixth surface 132. The gashes 141, 142 are lined abreast, provided for user's hand to penetrate therethrough. Thus, the electronic product can be manually held easily.

Figure 1:
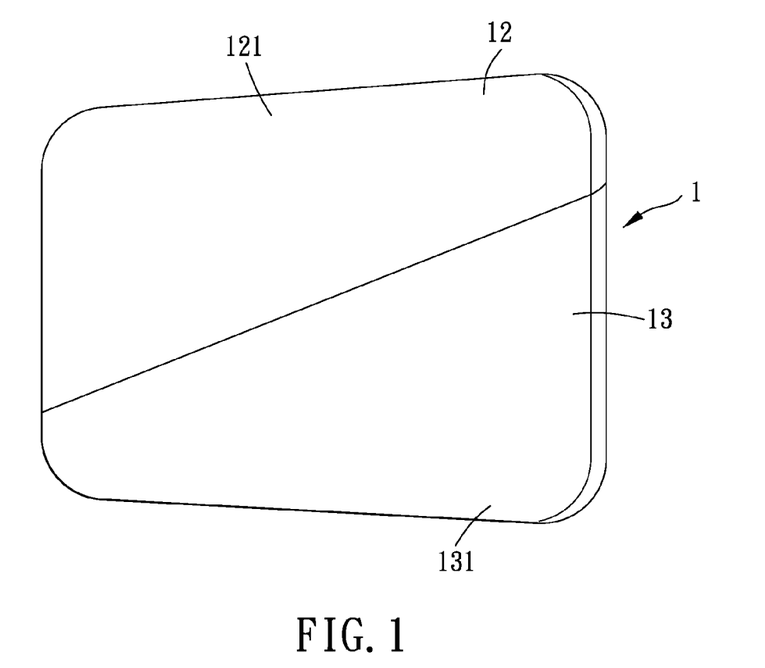
FIG. 1 is a stereogram showing a first embodiment of the present invention.
Figure 2:
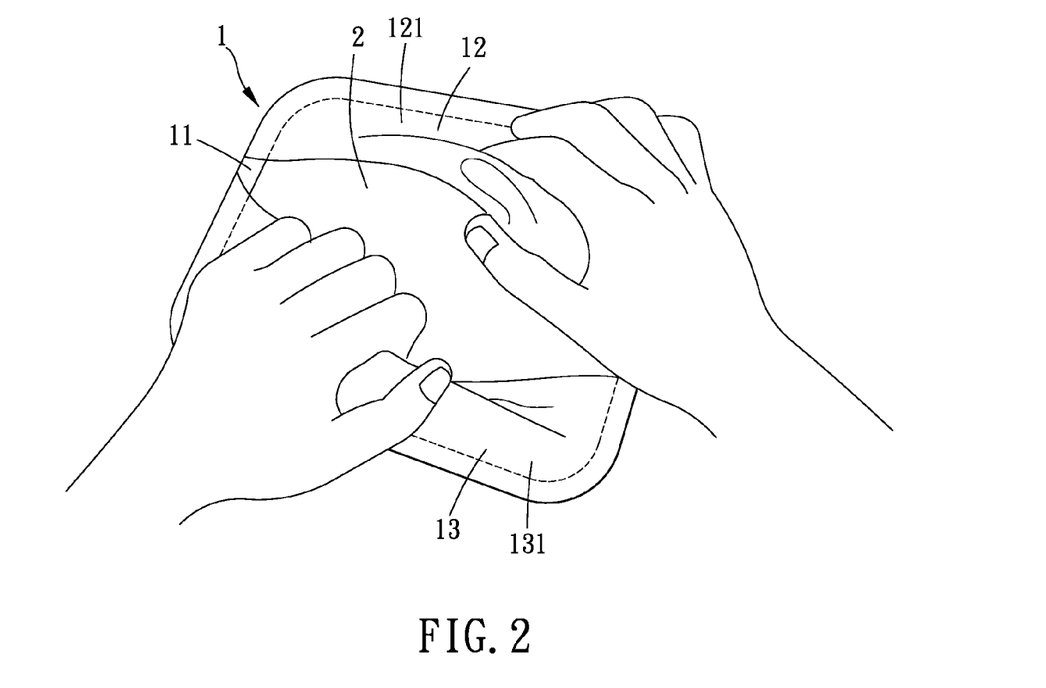
FIG. 2 is a schematic drawing showing a using condition of a first embodiment of the present invention.
Figure 3:
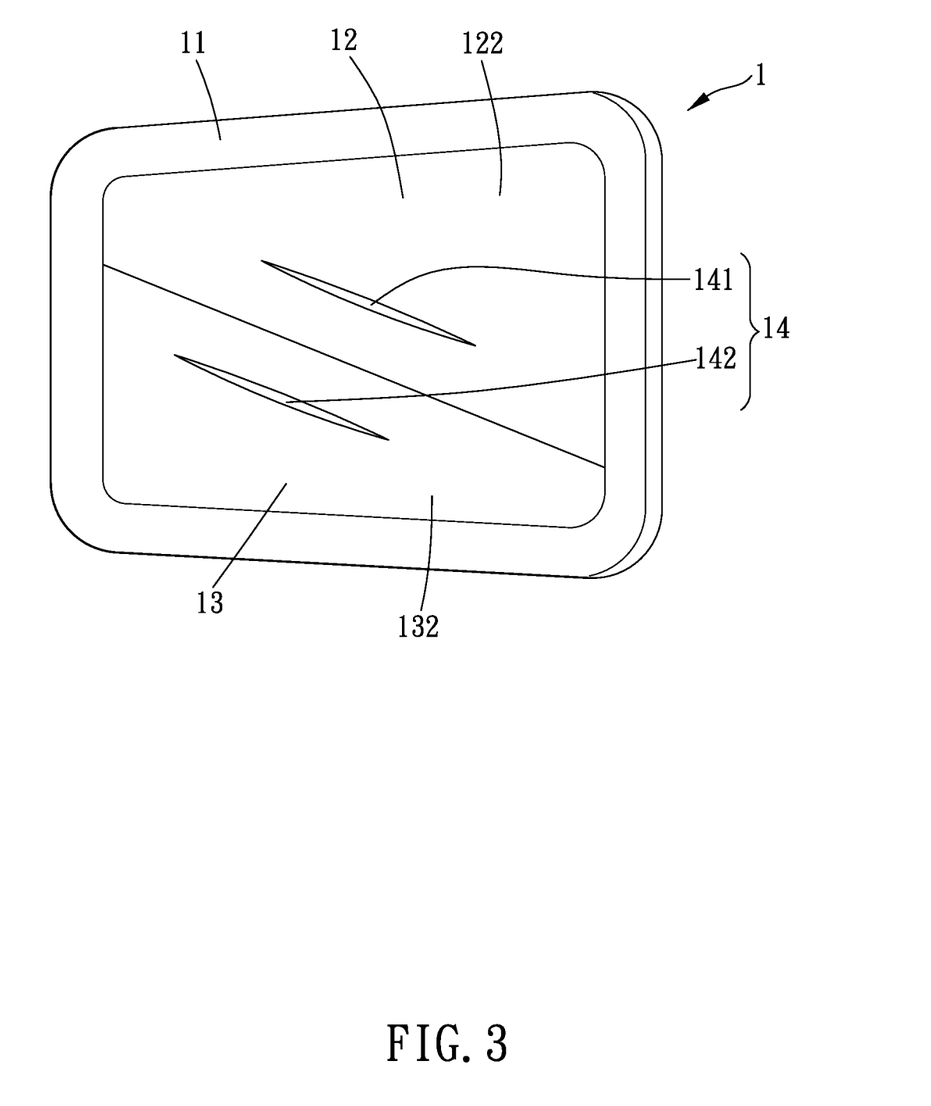
FIG. 3 is a stereogram showing a first embodiment of the present invention.
Figure 4:
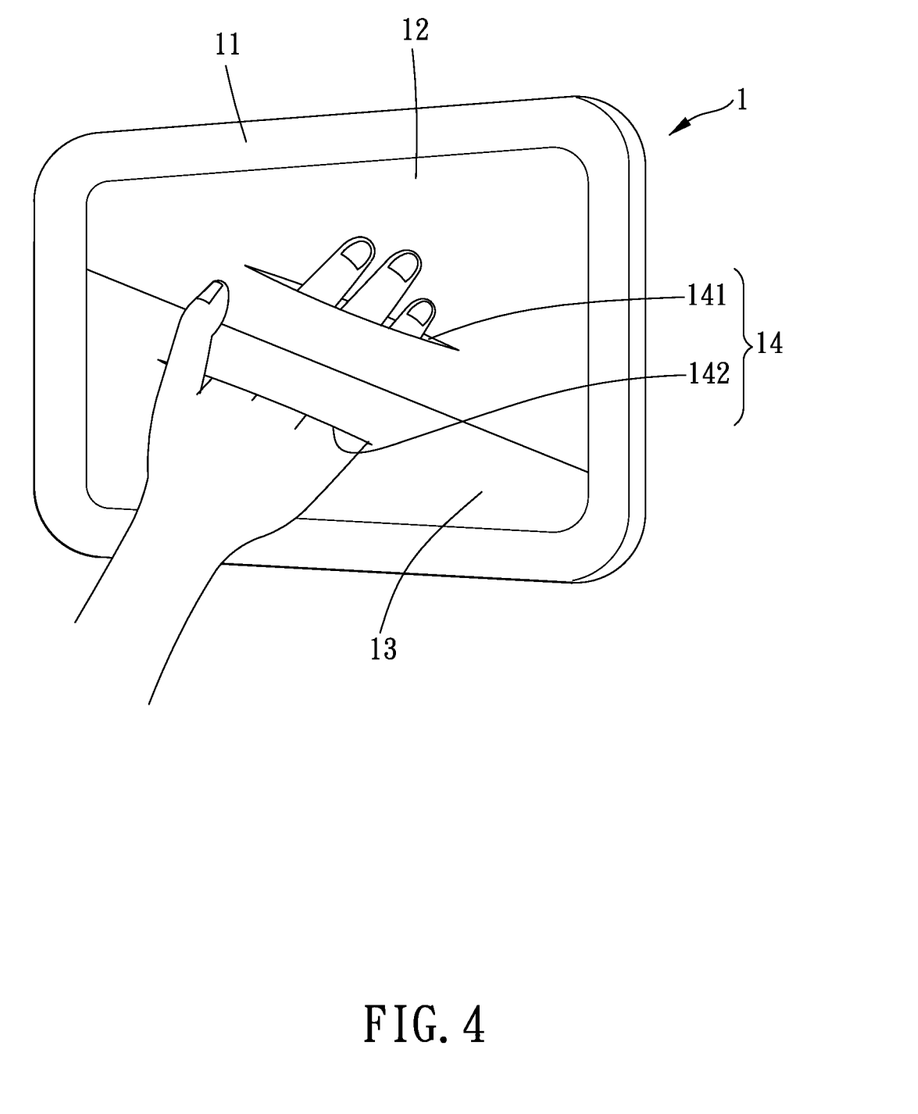
FIGS. 4 and 5 are schematic drawings showing a using condition of a first embodiment of the present invention.
Figure 5:
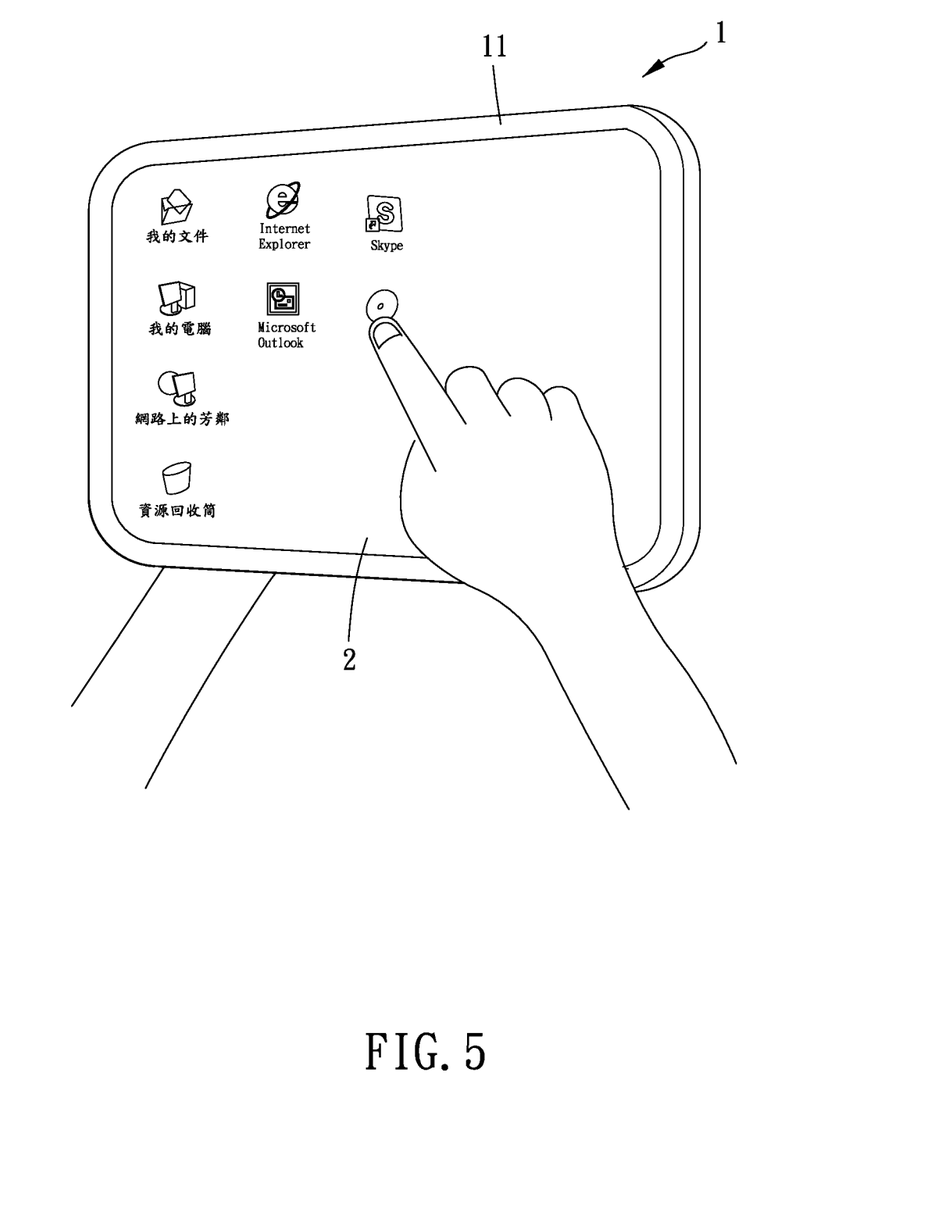
Figure 6:
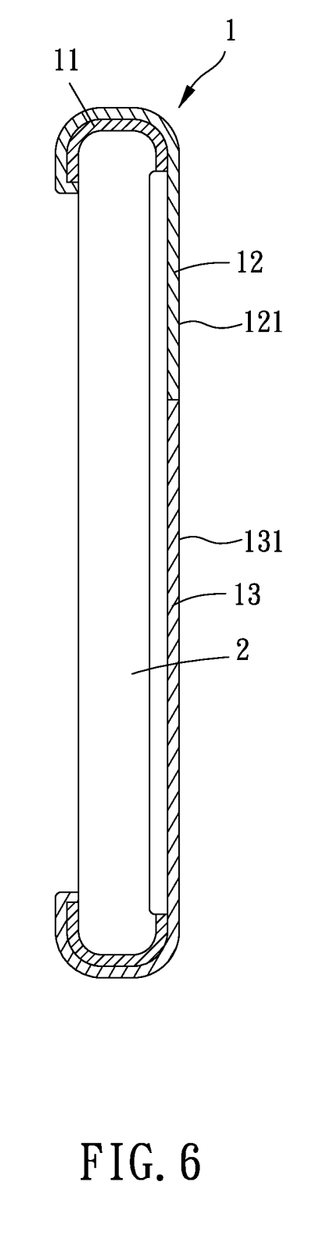
FIGS. 6 and 6A are profiles showing a first embodiment of the present invention.
Figure 6A:
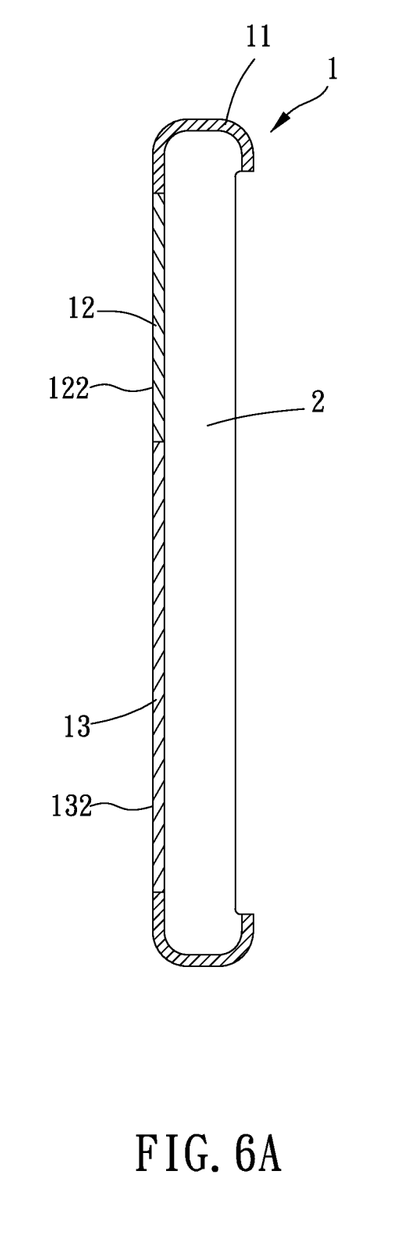
Figure 7:
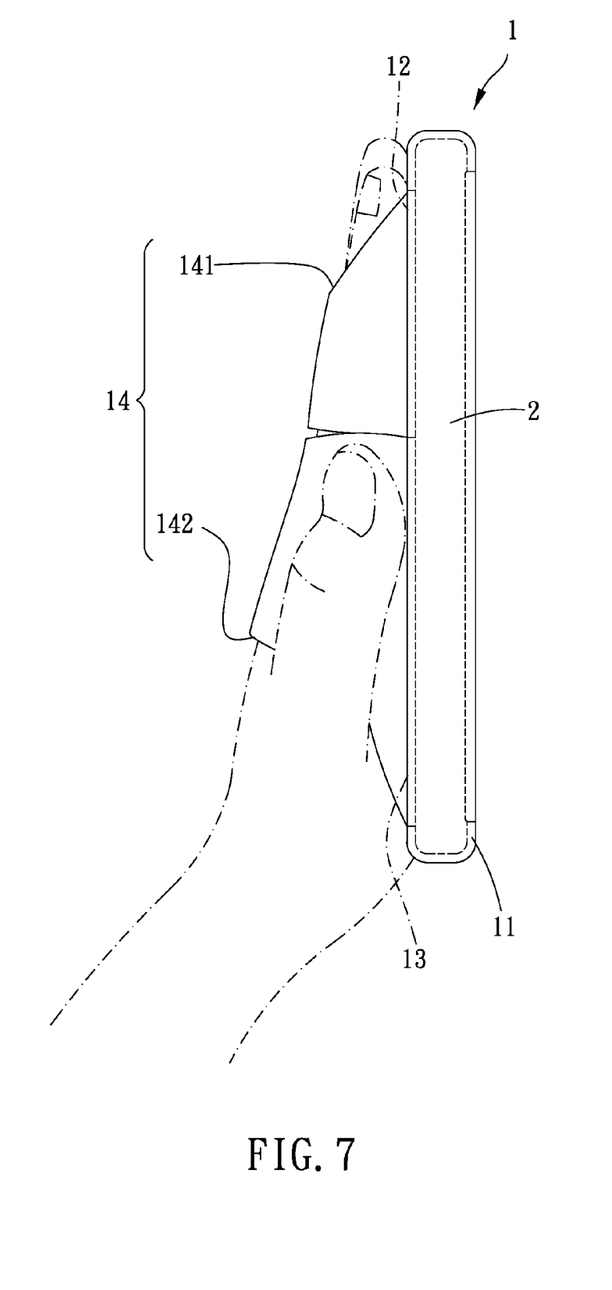
FIGS. 7 and 8 are lateral views showing a first embodiment of the present invention.
Figure 8:
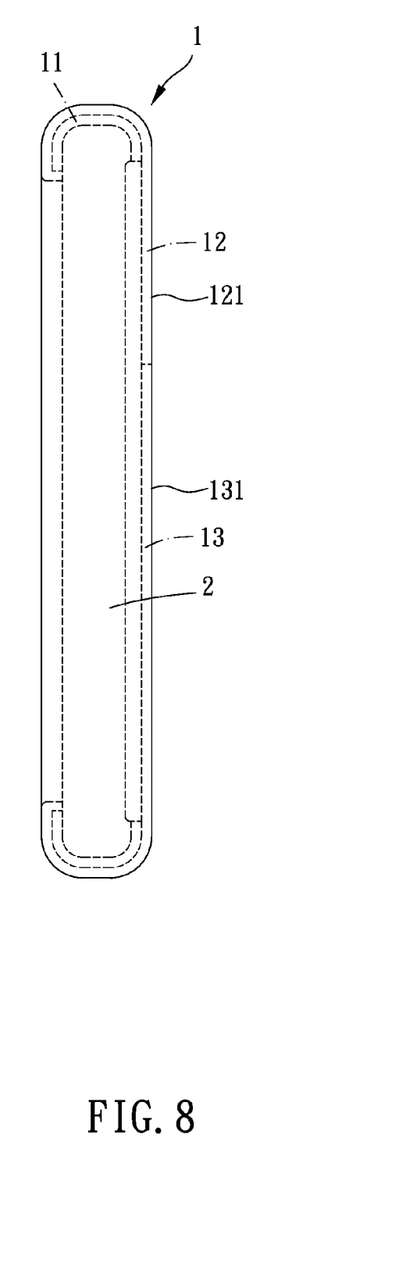

The first mask 12 and the second mask 13 are flexible, and preferably elastic. The masks can be flipped and turned over to the second surface of the attachment mechanism 11. After the masks are flipped and turned over, as shown in FIG. 2, FIG. 3, and FIG. 4, the third surface 121 of the first mask 12 and the fifth surface 131 of the second mask 13 face the second surface of the attachment mechanism 11. The electronic product 2 received in the receiving space and the hand holding structure 14 are then exposed outwardly. Thus, user can hold the electronic product 2 with the hand holding structure 14, and manipulate the electronic product 2. Falling and slipping of the electronic product 2 is prohibited.

After manipulation, the electronic product is stored or carried around. Please refer to FIG. 1 and FIG. 8. The first mask 12 and the second mask 13 can be flipped and turned back to the first surface of the attachment mechanism 11. The masks cover the electronic product 2. Thus, the electronic product 2 is protected from accidental collision. Additional protect bag can be dismissed.

For shock preventing and absorbing, the first mask and the second mask may be made from cloth, elastic fabric, or polyurethane, and the attachment mechanism may be made from silica gel or similar material which provides shock absorbing function.

Figure 9:
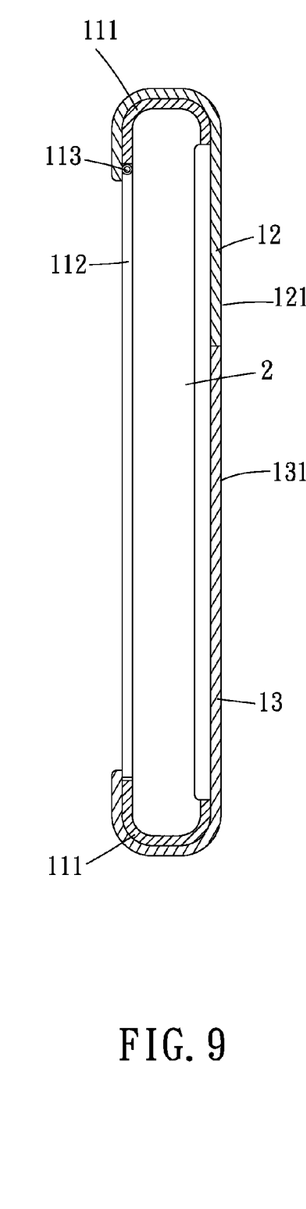
FIGS. 9 and 10 are profiles showing a second embodiment of the present invention.
Figure 10:
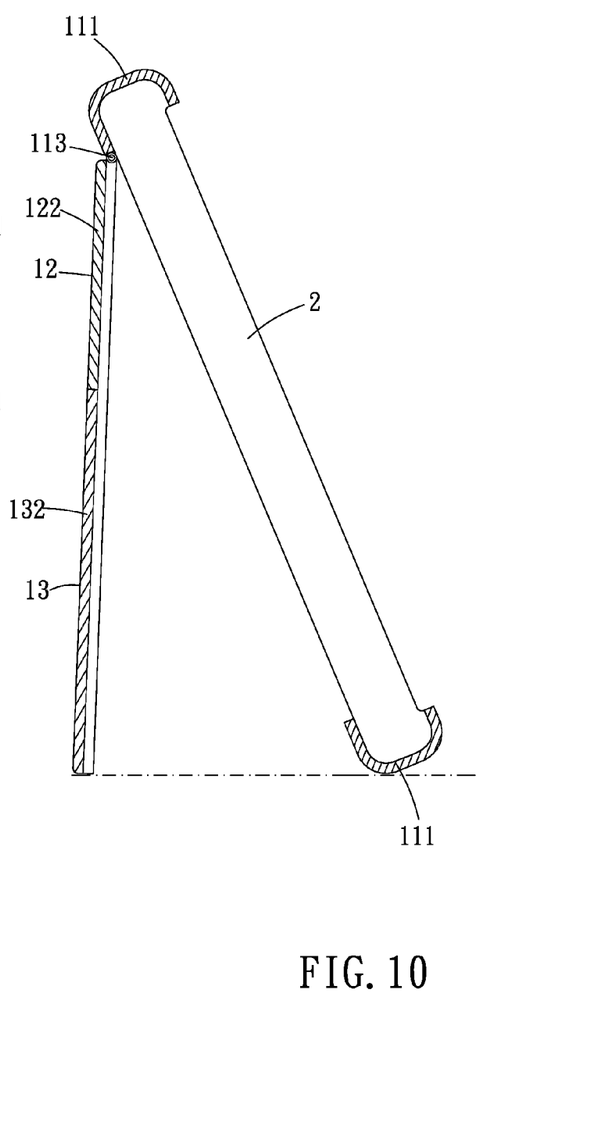
Figure 11:
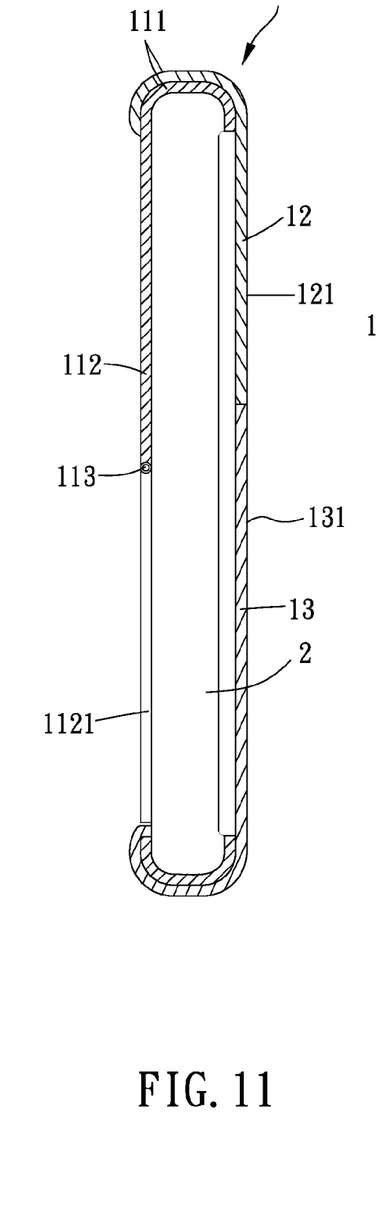
FIGS. 11 and 12 are profiles showing a third embodiment of the present invention.
Figure 12:
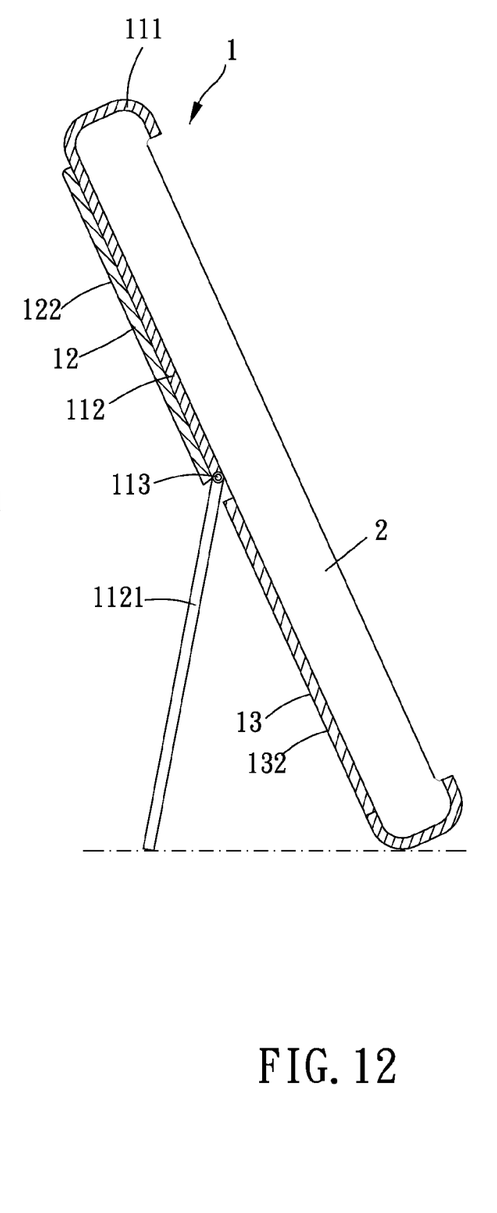
Figure 13:
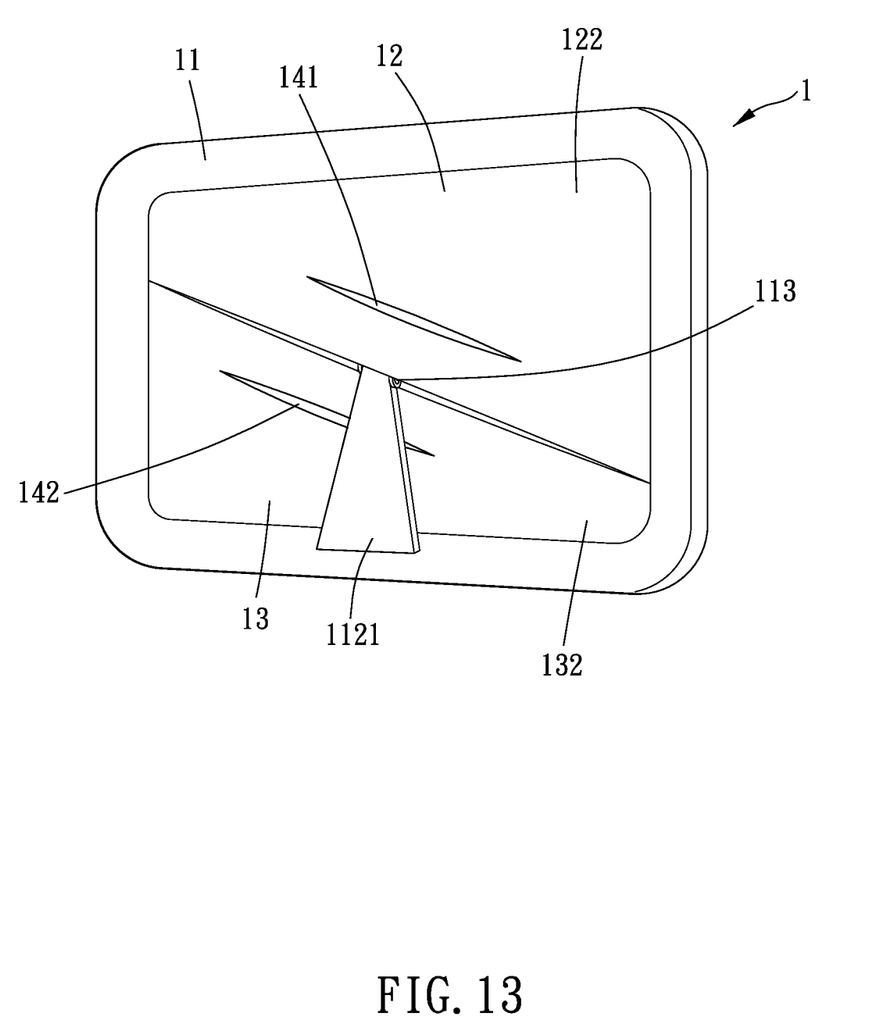
FIG. 13 is a schematic drawing showing a using condition of a third embodiment of the present invention.
Figure 14:
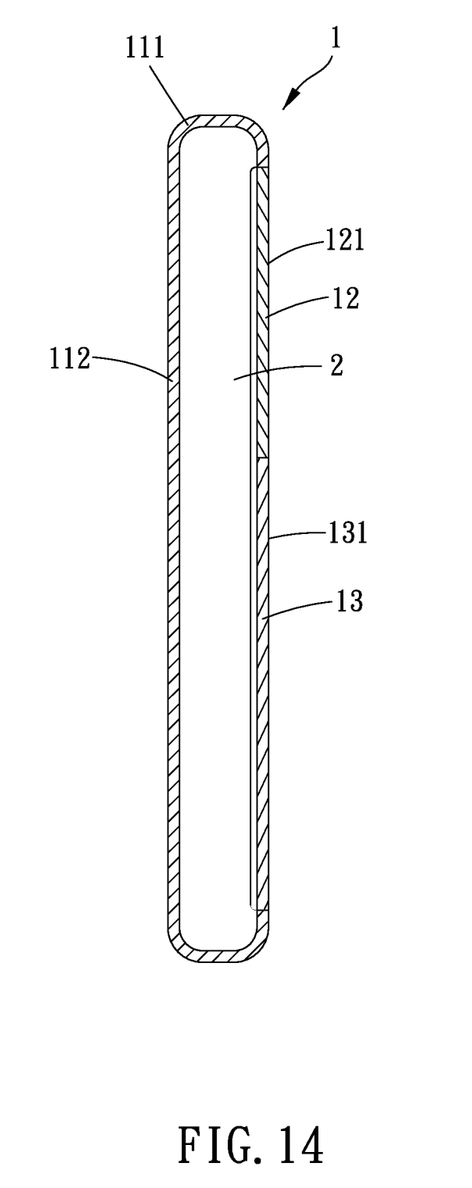
FIGS. 14 and 14A are profiles showing a fourth embodiment of the present invention.
Figure 14A:
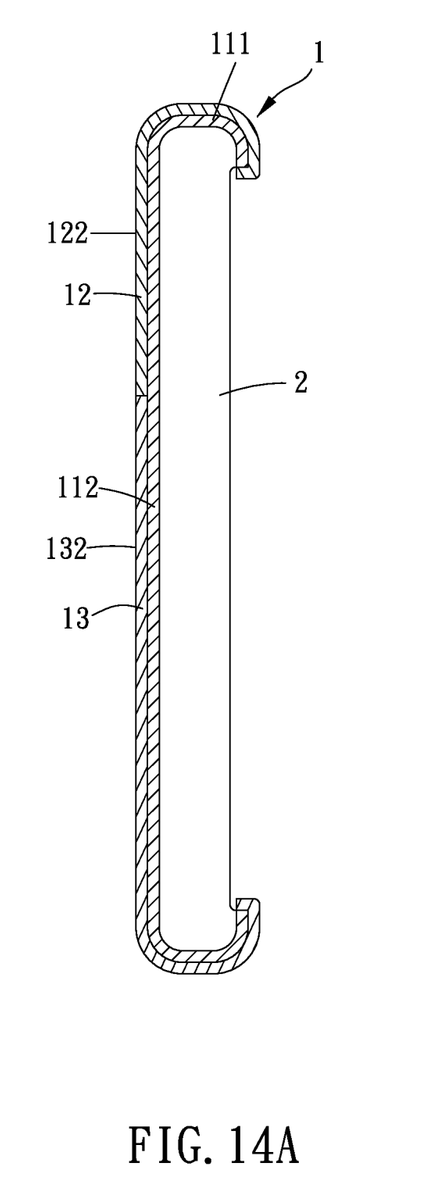
Figure 16:
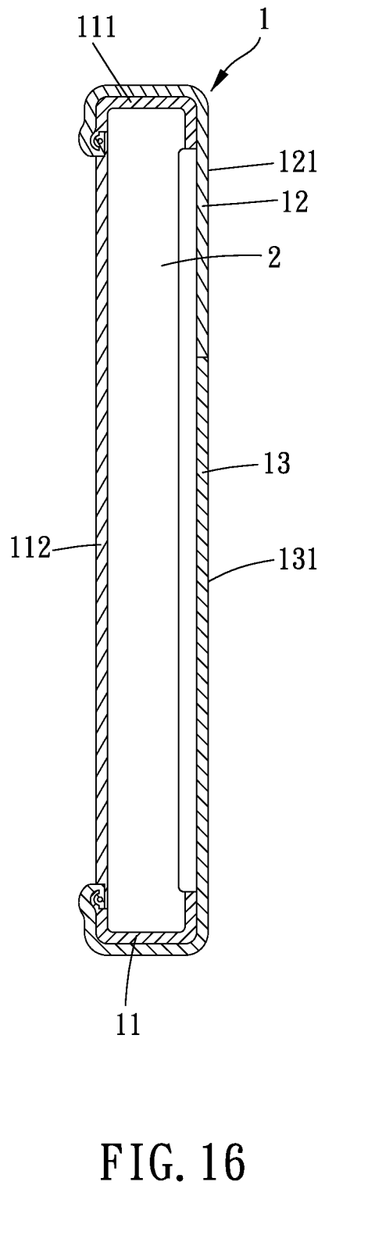
FIGS. 16 and 16A are profiles showing a sixth embodiment of the present invention.
Figure 16A:
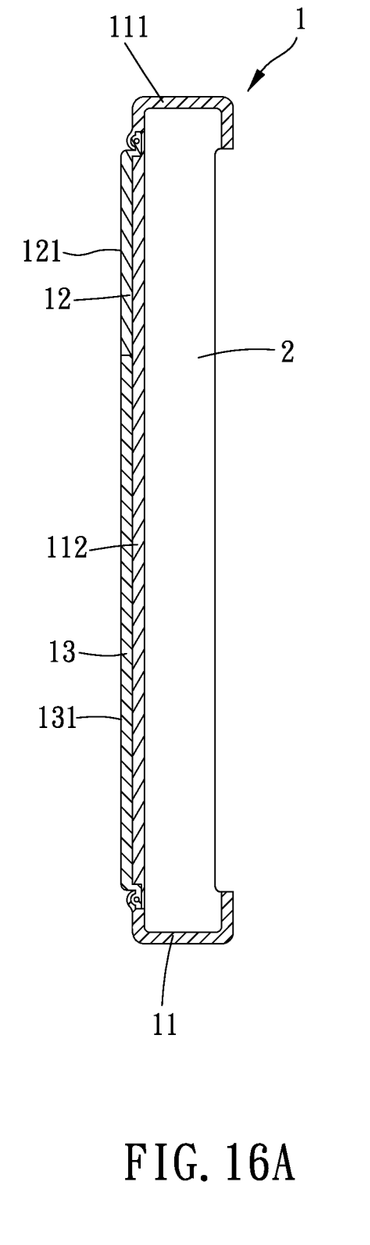

Please refer to FIG. 14 and FIG. 14A. In another embodiment, the attachment mechanism 11 includes a planar bottom layer 112 and an attaching frame 111. The attaching frame 111 can wrap the electronic product. The bottom layer 112 is located at the second surface of the attachment mechanism 11. The attaching frame 111 is located at the first surface of the attachment mechanism 11. The first mask 12 and the second mask 13 are then mounted to an annular frame. The annular frame can be stably positioned between the attaching frame 111 and the bottom layer 112. Thus, the masks 12, 13 are detachably connected to the attachment mechanism 11, as shown in FIG. 16 and FIG. 16A. For conveniently operating, the first mask 12 and the second mask 13 can be connected to the bottom layer 112, as shown in FIG. 9 and FIG. 10. A hinge 113 is disposed between one end of the attaching frame 111 and the bottom layer 112. The hinge 113 connects the bottom layer 112 to the attaching frame 111, so that the bottom layer 113 is able to pivot with respect to the attaching frame 111. Thus, when the first mask 12 and the second mask 13 which can be flipped arbitrarily are located on the bottom layer 112, a stand angle is defined between the bottom layer 112 and the attaching frame 111 by pivoting the bottom layer 112. By defining the stand angle, the holding aid can stand on table or on the ground. User can manipulate the electronic product 2 without holding it. In this condition, the first mask 12 and the second mask 13 further provide greater friction force or slip resistant performance between the bottom layer 112 and the table. The electronic product and the holding aid are then held in position stably. It is noted that the pivoting means between the bottom layer and the attaching frame is not limited in the embodiment described above. Please refer to FIG. 11 to FIG. 13. The bottom layer 112 can be mounted to the attaching frame 111. A hinge 113 is then connected between the bottom layer 112 and a supporting plate 1121. The hinge 113 connects the supporting plate 1121 to the bottom layer 112. Preferably, the hinge 113 is centrally located on the bottom layer 112. Thus, the supporting plate 1121 can pivot with respect to the bottom layer 112, helping the holding aid standing on table or on the ground. In this embodiment, the first mask 12 and the second mask 13 can be flipped after the supporting plate 1121 is pivot to a predetermined position. Thus, the masks can cover the bottom layer 112 rather than the supporting plate 1121.

Accordingly, the holding aid is provided with masks which provide functions of covering, sheltering, and easy holding. Accessories for these individual functions are no more necessary. In addition, the masks can provide comfortable touching and easy holding and grasping with elasticity and flexibility. Besides, the hand holding structure is provided without additional component. Weight of the holding aid can be managed well.

What is claimed is:

1. A holding aid, comprising a main body which comprises:
    an attachment mechanism which is utilized for attaching on an electronic product, the attachment mechanism having a first surface and a second surface which are opposite to each other, the attachment mechanism having a positioning portion, the electronic device being able to be positioned in the positioning portion, the positioning portion being located between the first surface and the second surface;
    a first mask which is planar and flexible, the first mask having a third surface and a fourth surface which are opposite to each other, the first mask being parallel to the attachment mechanism, at least a part of a periphery of the first mask being fixedly connected to at least a part of a periphery of the attachment mechanism, the fourth surface facing the first surface;
    a second mask which is planar and flexible, the second mask having a fifth surface and a sixth surface which are opposite to each other, the second mask being parallel to the attachment mechanism, at least a part of a periphery of the second mask being fixedly connected to at least a part of the periphery of the attachment mechanism, the sixth surface facing the first surface;

at least a hand holding structure, disposed on at least one of the fourth surface of the first mask and the sixth surface of the second mask;

wherein a receiving space is defined by the attachment mechanism, the fourth surface of the first mask, and the sixth surface of the second mask, the receiving space is adapted for the electronic product to be received therein;

wherein the first mask and the second mask are able to be flipped and turned over to the second surface of the attachment mechanism, the third surface of the first mask and the fifth surface of the second mask face the second surface of the attachment mechanism when the first mask and the second mask are flipped and turned over, so that the hand holding structure and the electronic product positioned in the positioning portion are exposed outwardly, the electronic device is able to positioned to the third surface of the first mask and the fifth surface of the second mask and is able to be supported by the hand holding structure, and prepared for manually holding and operating.

2. The holding aid of claim 1, wherein the attachment mechanism is an attaching frame which is able to wrap a periphery portion of the electronic product.

3. The holding aid of claim 1, wherein the attachment mechanism comprises a planar bottom layer which is located at the second surface of the attachment mechanism and an attaching frame which is able to wrap the electronic product.

4. The holding aid of claim 1, wherein an edge of the first mask and an edge of the second mask which are not connected to the attachment mechanism are lined abreast and adjacent each other, so that the first surface of the attachment mechanism is covered by the first mask and the second mask.

5. The holding aid of claim 1, wherein the hand holding structure comprises two gashes which are formed on the fourth surface of the first mask and the sixth surface of the second mask respectively, the gashes are lined abreast, so that the gashes are adapted for a hand to penetrate therethrough.

6. The holding aid of claim 1, wherein the first mask and the second mask are partially connected and formed in single piece.

* * * * *